United States Patent [19]

Göransson et al.

[11] 3,760,301

[45] Sept. 18, 1973

[54] SWITCHABLE BAND-PASS FILTER HAVING RESONANT CIRCUIT ENERGIZED INDUCTIVELY FROM CONSTANT CURRENT SOURCE

[75] Inventors: Kjell Göransson, Sodertalje; Jan-Åke Dahlgren, Alvsjo, both of Sweden

[73] Assignee: Sonab Development AB, Vallingby, Sweden

[22] Filed: Dec. 5, 1972

[21] Appl. No.: 312,371

[30] Foreign Application Priority Data

Dec. 6, 1971 Sweden ............................ 15640/71

[52] U.S. Cl. ........... 333/70 R, 331/117 R, 331/179, 334/56

[51] Int. Cl. ............................................ H03h 7/10

[58] Field of Search .................. 333/70 R; 331/179, 331/117 R; 334/56

[56] References Cited

UNITED STATES PATENTS

| | | | |
|---|---|---|---|
| 2,761,066 | 8/1956 | Robinson | 334/56 X |
| 3,427,569 | 2/1969 | Abramson | 334/56 X |

*Primary Examiner*—Paul L. Gensler
*Attorney*—Eric H. Waters et al.

[57] ABSTRACT

A band-pass filter device, which can be switched selectively between several different frequencies, comprises a parallel resonance circuit containing a capacitance and a coil provided with several taps and switching means connected to the taps on the coil for inserting selectively and alternatively differently large portions of the coil into the resonance circuit. The resonance circuit is energized inductively from a constant current source through the coil of the resonance circuit. The input signal to the filter is applied as a control signal to the constant current source and the output on the filter device is connected across the resonance circuit.

4 Claims, 3 Drawing Figures

2 Sheets-Sheet 1

SWITCHABLE BAND-PASS FILTER HAVING RESONANT CIRCUIT ENERGIZED INDUCTIVELY FROM CONSTANT CURRENT SOURCE

FIELD OF THE INVENTION

The present invention is related to a band-pass filter device which can be switched selectively between several different frequencies.

DESCRIPTION OF THE PRIOR ART

In communication radio systems, wireless paging systems and remote control systems, wireless data communication systems and many similar systems it is generally required that a plurality of different receivers can be called selectively from a central transmitter station. Preferably this is achieved in that for calling a particular receiver the transmitter station transmits a sequence of a predetermined number of tone signal pulses having predetermined frequencies, which forms a tone sequence code, which is individually assigned to be used as a call signal for said particular receiver. By transmitting, for each call, for instance three consecutive tone signals, of which each can have any selected one of for instance ten different frequencies, it is in this way possible to call selectively 1,000 different receivers. In a system for selective calling of this type it is required on the one hand that the transmitter station is provided with an oscillator unit, which can be switched between the different tone frequencies being used in the tone sequence codes, and on the other hand that each reciever in the system is provided with a detector or decoder unit which can detect the frequency of each tone signal pulse in the tone sequence code being transmitted from the transmitter station when calling a receiver and determine whether the frequency of the detected tone signal pulse is in conformity with the predetermined tone sequence code which has been individually assigned as a call signal for the receiver concerned. In previously known systems of this type one uses often in the transmitter station an oscillator unit comprising a plurality of separate frequency determining circuits corresponding in number to the number of different tone frequencies used in the tone sequence codes. For the transmission of a tone sequence code for a call to a particular receiver these separate frequency determining circuits are activated selectively and sequencially in conformity with the tone sequence code to be transmitted. In each receiver in the system one uses in similar manner several separate tuned circuits corresponding in number to the number of consecutive tone signals in the tone sequence code used as a call signal for the receiver concerned and being tuned to the frequencies of the tone signals in said tone sequence code. This prior art arrangement requires, however, a large number of components, which causes correspondingly large costs, space requirements and risks of faults and malfunction.

SUMMARY OF THE INVENTION

The primary object of the present invention is therefore to provide a frequency discriminating circuit in the form of a band-pass filter, which is of a simple design and requires a smaller number of components and less space and which can be switched selectively between a plurality of different frequencies so as to be usable in a system of the type described in the foregoing as a frequency discriminating circuit in the oscillator unit of the transmitter station as well as in the tone sequence decoders in the receivers.

For this object the band-pass filter device according to the invention comprises a single parallel resonance circuit including a capacitance and a coil provided with a plurality of tabs and switching means cooperating with said tabs for inserting selectively and alternatively different portions of the coil into the resonance circuit, whereby the resonance circuit can be tuned selectively to different resonance frequencies.

A band-pass filter device according to the invention can consequently be tuned selectively to any one of a number of different frequencies corresponding to the number of different tabs on the coil of the resonance circuit but includes in spite of this only a single capacitor and a single coil. As a consequence the necessary number of components in the band-pass filter device according to the invention is very small, which gives lower costs, reduced space requirements for the filter device and substantially reduced risks of faults and malfunction in the filter device. As a band-pass filter device according to the invention includes only a single coil, a comparatively large core can be used for this coil, which results in a correspondingly large Q-value for the filter.

An additional and more specific object of the invention is to provide a band-pass filter device of the type defined above, which has a constant Q-value for all frequencies and an output voltage at resonance which is also constant and independent of the frequency to which the filter is presently tuned. The constant and frequency-independent voltage of the output signal of the filter at resonance facilitates substantially a subsequent detection of the output signal from the filter.

These additional objects of the invention is achieved with a band-pass filter device of the kind defined above in that the parallell resonance circuit is devoid of discrete resistances, that the parallel resonance circuit is fed inductively through its coil from a constant current source controlled by the input signal supplied to the filter device, and that the output of the filter is connected across the resonance circuit to a load having a large impedance as compared to the impedance at resonance of the resonance circuit.

BRIEF DESCRIPTION OF THE DRAWINGS

The invention and additional advantageous features thereof will be described more in detail in the following with reference to the accompanying drawings, which show by way of example some embodiments of the invention. In the drawings

Corresponding components are provided with the same reference numerals in all drawings.

DESCRIPTION OF THE ILLUSTRATED EMBODIMENTS

Figure 1:
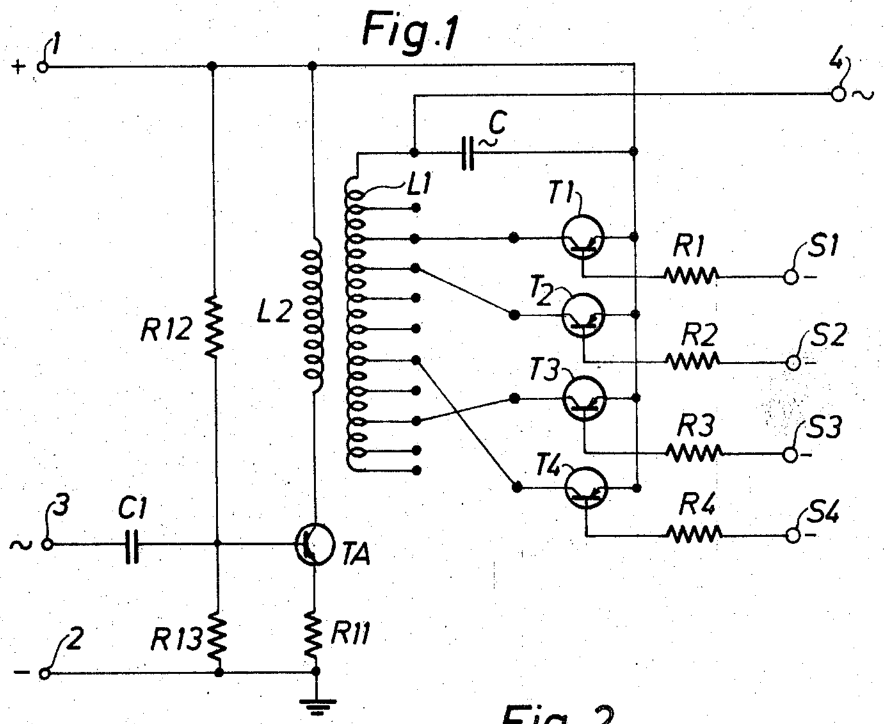
FIG. 1 shows by way of example a circuit diagram for a first embodiment of a band-pass filter device according to the invention.

The band-pass filter device according to the invention illustrated by way of example in FIG. 1 includes a parallel resonance circuit consisting of a capacitor C and a coil L1. The coil L1 is provided with several different taps. In the illustrated embodiment the coil L1 is provided with ten taps. One end terminal of the coil L1 is connected directly to one side of the capacitor C, whereas the opposite side of the capacitor C can be connected selectively and alternatively to any one of four different taps on the coil L1 through four PNP switch transistors T1, T2, T3 and T4 respectively. The transistors have their collectors connected to said four taps on the coil L1 and their emitters jointly connected to the opposite side of the capacitor C and to the positive pole 1 of a dc supply voltage source for the filter device. The bases of the transistors T1 to T4 are connected through individual base resistors R1, R2, R3 and R4 respectively to a biasing or control input terminal S1, S2, S3 and S4 respectively. By suitable means not illustrated in the drawing, as for instance mechanical switches, semiconductor switches or logic circuits, negative potential can be applied selectively and alternatively to any one of the control input terminals S1 to S4, whereby the corresponding transistor T1 to T4 is rendered conducting. It is appreciated that in this way it is possible by means of the transistors T1 to T4 to insert selectively and alternatively four differently large portions of the coil L1 into the resonance circuit and thus to tune the resonance circuits to four different resonance frequencies.

It is also obvious that the number of different frequencies to which the resonance circuit and thus the band-pass filter can be tuned, can be changed by changing the number of switch transistors. It is also obvious that the individual values of said frequencies can be changed in that the switch transistors T1 to T4 are connected to other taps on the coil L1. Thus, the band-pass filter device illustrated by way of example in FIG. 1, which has ten different taps on the coil L1 and four switch transistors T1 to T4, has ten different possible pass frequencies of which any four frequencies can be selected dependent on the connections between the taps of the coil L1 and the collectors of the transistors T1 to T4.

The resonance circuit includes no discrete resistances but only the internal resistance of the coil L1. The internal resistance in the presently conducting switch transistor T1 to T4 is negligible as compared with the internal resistance of the portion of the coil L1 which is presently inserted in the resonance circuit. This is true also when the smallest possible portion of the coil L1 is inserted in the resonance circuit.

The resonance circuit is fed inductively from a constant current source through a winding L2 coupled inductively to the coil L1 of the resonance circuit. Consequently, the constant current source has a large output inpedance as compared to the input impedance of the resonance circuit. In the band-pass filter device according to the invention illustrated by way of example in FIG. 1 the constant current source consists of an amplifier transistor TA, which has its collector connected to the positive pole 1 of the dc supply voltage source through the winding L2 and its emitter connected to the negative pole 2 of the dc voltage source through a resistor R11. The base of the transistor TA is biased by a voltage divider comprising two resistors R12 and R13 and is connected to the signal input terminal 3 of the filter through a capacitor C1.

The signal output terminal 4 of the filter is connected to the junction between the capacitor C and the coil L1 so that the output of the filter device is connected across the resonance circuit. The signal output terminal 4 of the filter device and thus the output signal from the filter is connected to a load (not illustrated in the drawing), which can consist for instance of detector circuits for the output signal when the band-pass filter is used in a signal decoder or of a feed-back circuit to the signal input of the filter when the filter is used as a frequency determining circuit in an oscillator, and it is implied that this load has an input impedance which is large as compared to the impedance at resonance of the resonance circuit so that the resonance circuit is substantially un-loaded on its output.

It is appreciated that if ac signals are applied to the input terminal 3 of the filter device, only those will cause a corresponding output signal on the output terminal 4 of the filter device, which have a frequency equal to the actual resonance frequency of the parallel resonance circuit. As mentioned in the foregoing, the actual resonance frequency of the parallel resonance circuit is determined by the presently conducting one of the switch transistors T1 to T4.

The illustrated band-pass filter device according to the invention has a constant Q-value independent of its actual frequency and also a constant output voltage at resonance which is independent of the actual frequency of the filter. This will be shown in the following:

As the parallel resonance circuit does not include any other resistances than the internal resistance in the portion of the coil L1 actually inserted in the resonance circuit and, furthermore, is substantially un-loaded on its output as well as on its input, Q is determined by the expression $$Q = \omega_o L/r \tag{1}$$

in which $\omega_o$ is the resonance frequency to which the resonance circuit is actually tuned and L and r are the inductance and resistance respectively of the portion of the coil L1 actually inserted in the resonance circuit. As $\omega_o = 1/\sqrt{LC}$ (2)

the equation (1) can be written as $$Q = 1/r \sqrt{L/C} \tag{3}$$

in which $C$ is the capacitance of the capacitor $C$ in the resonance circuit. For the inductance L and the resistance $r$ one has the relations $$L = k_1 N_1^2 \tag{4}$$

$$r = k_2 N_1 \tag{5}$$

in which $N_1$ is the number of winding turns in the portion of the coil L1 actually inserted in the resonance circuit and $k_1$ and $k_2$ are porportionality constants. The expression (5) is exactly true only on the assumption that the diameter of the winding turns is substantially constant for all parts of the coil. Of course, this is not exactly true, as the outermost turns of the coil must have a somewhat larger diameter than the innermost turns in the coil. The percentage deviation of the actual diameter of the turns from a mean diameter of the coil can be kept small, however, in that the inner diameter of the coil is made large. Alternatively the internal resistance of the portion of the coil actually inserted in the resonance circuit can be made substantially directly porportional to the number of winding turns inserted in the resonance circuit in that the diameter of the wire or conductor of the coil is increased as the diameter of the winding turns is increased.

Insertion of the expressions (4) and (5) in the expression (3) gives $$Q = 1/k_2 \sqrt{k_1/C} \quad (6)$$

As the capacitance $C$ of the capacitor is constant, also the Q-value will be constant and independent of the frequency to which the resonance circuit is actually tuned.

The parallel impedance $Z_o$ at resonance for the resonance circuit is determined by the expression $$Z_o = L/rC \quad (7)$$

Insertion of the expressions (4) and (5) in this expression (7) gives $$Z_o = k_3 N_1 \quad (8)$$

in which $k_3$ is proportionality constant. If the resonance impedance $Z_o$ of the resonance circuit is transformed to the winding L2 in the transformer formed by this winding and the resonance coil L1, this gives the expression $$Z'_o = Z_o(N_2/N_1)^2 \quad (9)$$

in which $Z'_o$ is the resonance impedance $Z_o$ of the resonance circuit as transformed to the winding L2 and $N_2$ is the number of turns in the winding L2. As $N_2$ is constant, insertion of the expression (8) in the expression (9) gives $$Z'_o = k_4\, 1/N_1 \quad (10)$$

in which $k_4$ is a proportionality constant.

The voltage $U_p$ across the primary winding L2 of the transformer L2/L1 is consequently at resonance $$U_p = i_p \cdot Z'_o = i_p \cdot k_4\, 1/N_1 \quad (11)$$

in which $i_p$ is the current through the primary winding L2. The current $i_p$ is constant, as the winding L2 is fed with constant current from the constant current source TA, wherefore $$U_p = k_5\, 1/N_1 \quad (12)$$

in which $k_5$ is a constant of proportionality. The voltage $U_s$ across the resonance circuit and thus the output voltage on the output terminal 4 of the filter device is consequently $$U_s = U_p\, N_1/N_2 = k_5\, 1/N_2 \quad (13)$$

As the number of turns $N_2$ of the winding L2 is constant, the output voltage of the filter device will be constant and independent of the frequency to which the filter device is actually tuned.

Figure 2:
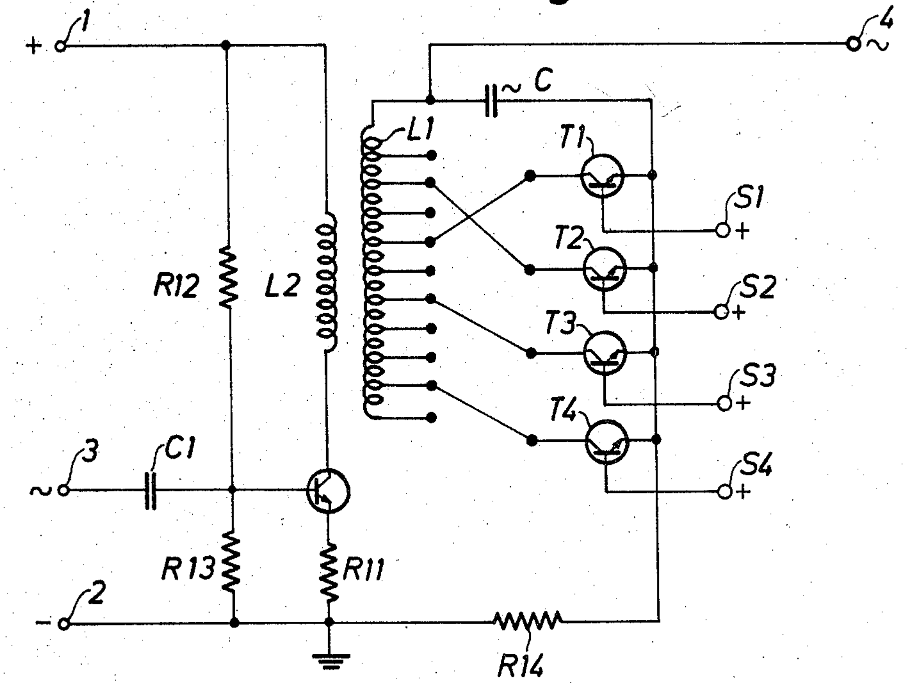
FIG. 2 shows a circuit diagram for a second embodiment of a band-pass filter device according to the invention, which is somewhat modified relative to the filter device illustrated in FIG. 1.

The somewhat modified band-pass filter device according to the invention illustrated in FIG. 2 distinguishes from the filter device shown in FIG. 1 and described in the foregoing substantially only therein that the switch transistors T1 to T4 are NPN transistors, wherefore they have their emitters jointly connected to earth and are made conductive by application of positive potential to their bases. Further, the separate individual base resistors R1 to R4 in FIG. 1 are replaced with a common resistor R14 in the connection between earth and the emitters of the transistors. It is appreciated that also in the band-pass filter illustrated in FIG. 1 the individual base resistors R1 to R4 could be replaced with a common resistor in the connection between the emitters of the transistors and the positive pole 1 of the supply voltage source. In the band-pass filter device illustrated in FIG. 2 it would of course also be possible to use individual base resistors for the transistors T1 to T4. In all other respects the band-pass filter illustrated in FIG. 2 is identical to the filter device illustrated in FIG. 1 and has also the same operation as the filter in FIG. 1.

Figure 3:
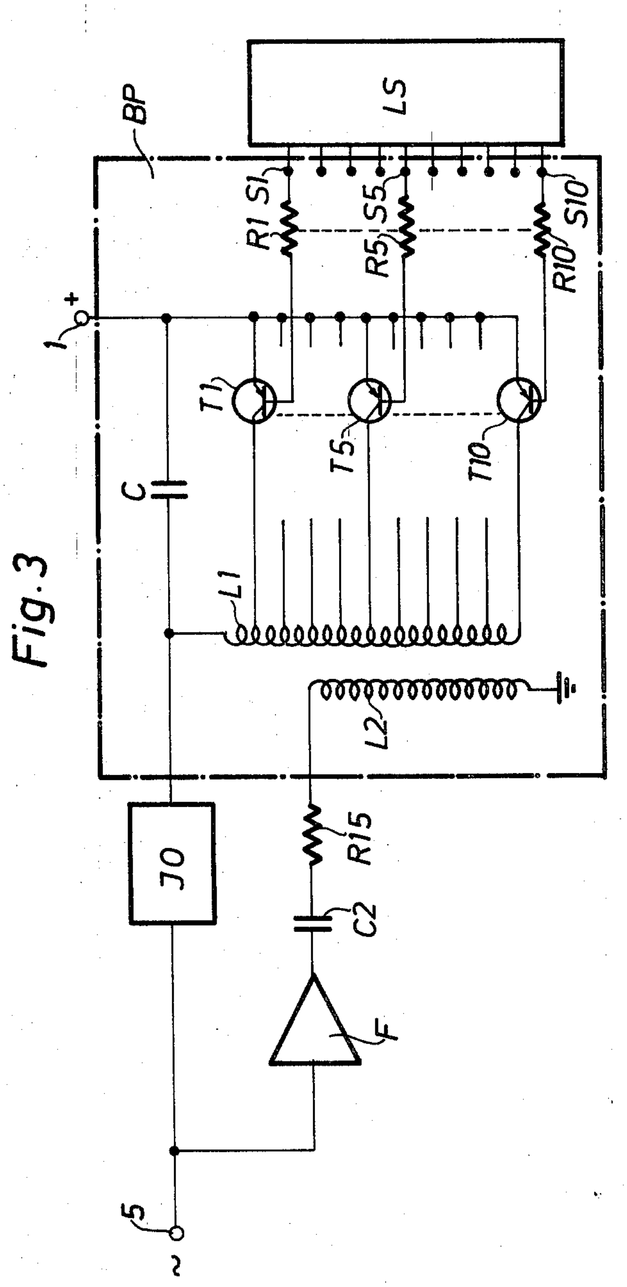
FIG. 3 illustrates by way of example and schematically a tone oscillator, which can be switched between several different frequencies so as to be usable for generating tone sequence codes and which includes a band-pass filter device according to the invention as its frequency determining circuit.

FIG. 3 shows by way of example and schematically how a band-pass filter device according to the invention can be used as a frequency determining circuit in an oscillator, which can be switched selectively between several different frequencies and thus can be used for generating call signals in the form of tone sequence codes.

The oscillator illustrated in FIG. 3 comprises a band-pass filter BP according to the present invention, which as described in the foregoing includes a parallel resonance circuit consisting of the capacitor C and the coil L1; provided also in this case by way of example with ten taps. The taps on the coil L1 are connected to one each of ten switch transistors T1 to T10; only the transistors T1, T5 and T10 being illustrated in the drawing for the sake of clarity. These switch transistors are PNP transistors and connected in the same manner as illustrated in FIG. 1. The transistors are controlled through individual base resistors R1 to R10 from a logic control unit LS. Consequently, the resonance circuit and thus the band-pass filter can be tuned to ten different frequencies in that the transistors T1 to T10 are rendered conducting selectively and alternatively, as described in the foregoing.

As described in the foregoing, the resonance circuit is fed from the winding L2, which is coupled inductively to the coil L1 and is energized from an amplifier F through a capacitor C2 and a resistor R15. The resistor R15 is dimensioned to have a resistance substantially larger than the input resistance of the resonance circuit at resonance, whereby the winding L2 is energized by a constant current as described in the foregoing and the conditions for a constant Q and a constant output voltage independent of the frequency of the band-pass filter are satisfied.

The output voltage from the band-pass filter BP is fed back to the input of the amplifier F through an impedance converter I0. The impedance converter I0 is dimensioned to have an input impedance which is substantially larger than the impedance at resonance of the resonance circuit so that the output of the resonance circuit is substantially un-loaded, which is the additional condition for a constant Q of the resonance circuit. The output signal from the oscillator is picked-up on the output terminal 5 connected to the output of the impedance converter I0. The output impedance of the impedance converter I0 is matched to the load (not illustrated in the drawing) connected to the output terminal 5 on the oscillator. The amplifier F consists preferably of an operational amplifier and is preferably designed to give a symmetric limitation so as to generate a square wave on its output, which is supplied to the winding L2 in the band-pass filter BP through the series resistor R15. The condition for oscillation of the oscillator is satisfied when any one of the switch transistors T1 to T10 is conducting and the oscillation frequency is then determined by the resonance frequency of the resonance circuit, that is by the transistor T1 to T10 actually conducting. The activation of the transistors T1 to T10 is controlled by the logic control unit LS. When no one of the switch transistors T1 to T10 is conducting, the conditions for oscillation of the oscillator are not satisfied, wherefore no signal is produced on the output terminal 5 of the oscillator.

It is appreciated that by suitable design and programming of the logic control unit LS the oscillator can be caused to generate a sequence of a predetermined number of separate signal pulses of predetermined frequencies, and that the frequencies of the signal pulses in each such sequence can be changed by changing the program of the logic control unit for the activation of the transistors T1 to T10.

Although the band-pass filter device according to the invention has been described in the foregoing in connection with a system for selective calling by the use of tone sequence codes, it is appreciated that the invention can also be used for many other applications where a need exists for a band-pass filter that can be switched selectively between several different frequencies.

We claim:

1. A band-pass filter device comprising a parallel resonance circuit devoid of discrete resistances and including a capacitor and a coil provided with a plurality of taps, switching means cooperating with said taps for inserting selectively and alternatively differently large portions of said coil in said parallel resonance circuit, a constant current source controlled by the input signal supplied to the filter device for feeding said parallel resonance circuit inductively through said coil, and an output load connected across said resonance circuit for receiving the output signal from the filter device, said output load having a large impedance as compared to the impedance at resonance of said resonance circuit.

2. A band-pass filter device as claimed in claim 1, wherein said constant current source includes an amplifier transistor having a base for receiving said input signal and a collector circuit including a winding coupled inductively to said coil of said resonance circuit.

3. A band-pass filter device as claimed in claim 1, wherein said switching means include at least two switch transistors having their collectors connected separately to one each of said taps on said coil of said resonance circuit and their emitters jointly connected to one side of said capacitor of the resonance circuit.

4. A band-pass filter device as claimed in claim 1, wherein said coil in said resonance circuit has an internal resistance between any one of said taps and one end terminal of the coil which is substantially directly proportional to the number of turns of the coil between said tap and said end terminal.

* * * * *